US006371056B1

(12) United States Patent
Phillips

(10) Patent No.: US 6,371,056 B1
(45) Date of Patent: Apr. 16, 2002

(54) METHOD AND APPARATUS FOR SECURING A PET

(76) Inventor: Ellen D. Phillips, 90 Thackery Rd., Rochester, NY (US) 14610

( * ) Notice: Subject to any disclaimer, the term of this patent is extended or adjusted under 35 U.S.C. 154(b) by 0 days.

(21) Appl. No.: 09/478,384

(22) Filed: Jan. 6, 2000

Related U.S. Application Data

(63) Continuation of application No. 08/921,631, filed on Aug. 27, 1997, now Pat. No. 6,095,094.
(60) Provisional application No. 60/132,180, filed on May 3, 1999, provisional application No. 60/024,620, filed on Aug. 27, 1996, and provisional application No. 60/038,924, filed on Feb. 22, 1997.

(51) Int. Cl.⁷ .............................................. A01K 27/00
(52) U.S. Cl. ....................... 119/793; 119/769; 119/797; 119/864
(58) Field of Search ................................ 119/769, 786, 119/788, 791, 792, 793, 795, 797, 856, 863, 864

(56) References Cited

U.S. PATENT DOCUMENTS

| 904,530 A | 11/1908 | Harlow | 119/856 |
| 2,743,702 A | * 5/1956 | Sullivan | 119/864 |
| 2,798,458 A | * 7/1957 | Odermatt | 119/864 |
| 2,861,547 A | * 11/1958 | Dale | 119/797 |
| 2,994,300 A | 8/1961 | Grahling | 119/770 |
| 3,104,650 A | 9/1963 | Grahling | 119/770 |
| 3,311,088 A | * 3/1967 | Peterlin | 119/793 |
| 3,768,445 A | 10/1973 | Sorrels | 119/856 |
| 3,867,905 A | 2/1975 | Vall, Jr. | 119/793 |
| 3,872,833 A | * 3/1975 | Herbert | 119/864 |
| 3,884,190 A | 5/1975 | Gurrey | 119/797 |
| 3,995,598 A | * 12/1976 | Gardner et al. | 119/864 |
| 4,398,500 A | 8/1983 | Koronkiewicz | 119/793 |
| 4,621,589 A | 11/1986 | Thinnes | 119/770 |
| 5,005,527 A | * 4/1991 | Hatfield | 119/793 |
| 5,099,799 A | * 3/1992 | Giacobbe | 119/793 |
| 5,174,246 A | 12/1992 | Driver | 119/795 |
| D359,599 S | 6/1995 | Archambault | D30/153 |
| 5,462,019 A | 10/1995 | Hong-Rong et al. | 119/795 |
| 5,485,811 A | 1/1996 | Jacobsen et al. | 119/798 |
| 5,709,172 A | * 1/1998 | Maglich | 119/797 |
| 5,947,062 A | * 9/1999 | Hoffman et al. | 119/769 |
| 5,967,095 A | * 10/1999 | Greves | 119/795 |
| 6,000,249 A | * 12/1999 | Wilber | 119/857 |

* cited by examiner

Primary Examiner—Darren W. Ark
(74) Attorney, Agent, or Firm—Fay, Sharpe, Fagan, Minnich & McKee, LLP

(57) ABSTRACT

A method and apparatus for securing a pet are disclosed. The apparatus includes an elongated leash having a proximal end and a distal end. The distal end of the leash includes a clasp connected thereto, and the clasp, itself, includes a locking mechanism (such as a key lock or a combination lock) therein that allows the clasp to open and close when unlocked and that prevents opening of the clasp when locked. The clasp is adapted for connection to a collar or a harness worn by the associated animal to be secured. When the clasp is connected to the collar or harness, enlargement or other operation of same for purposes of releasing the associated animal is prevented. Further, when the locking mechanism of the clasp is locked after the clasp has been connected to the collar or harness, unauthorized removal of the clasp from the collar or harness is prevented. The proximal end of the leash includes a handle that is preferably defined from conventional molded plastic or the like. A locking clasp is recessed in and fixedly secured to the handle. Thus, the proximal end of the leash, including the handle, is adapted for being wrapped around a post, tree, or other structure and the lock connected to the leash, itself so that a loop is formed around the structure. The handle lock prevents unauthorized removal of the loop.

5 Claims, 6 Drawing Sheets

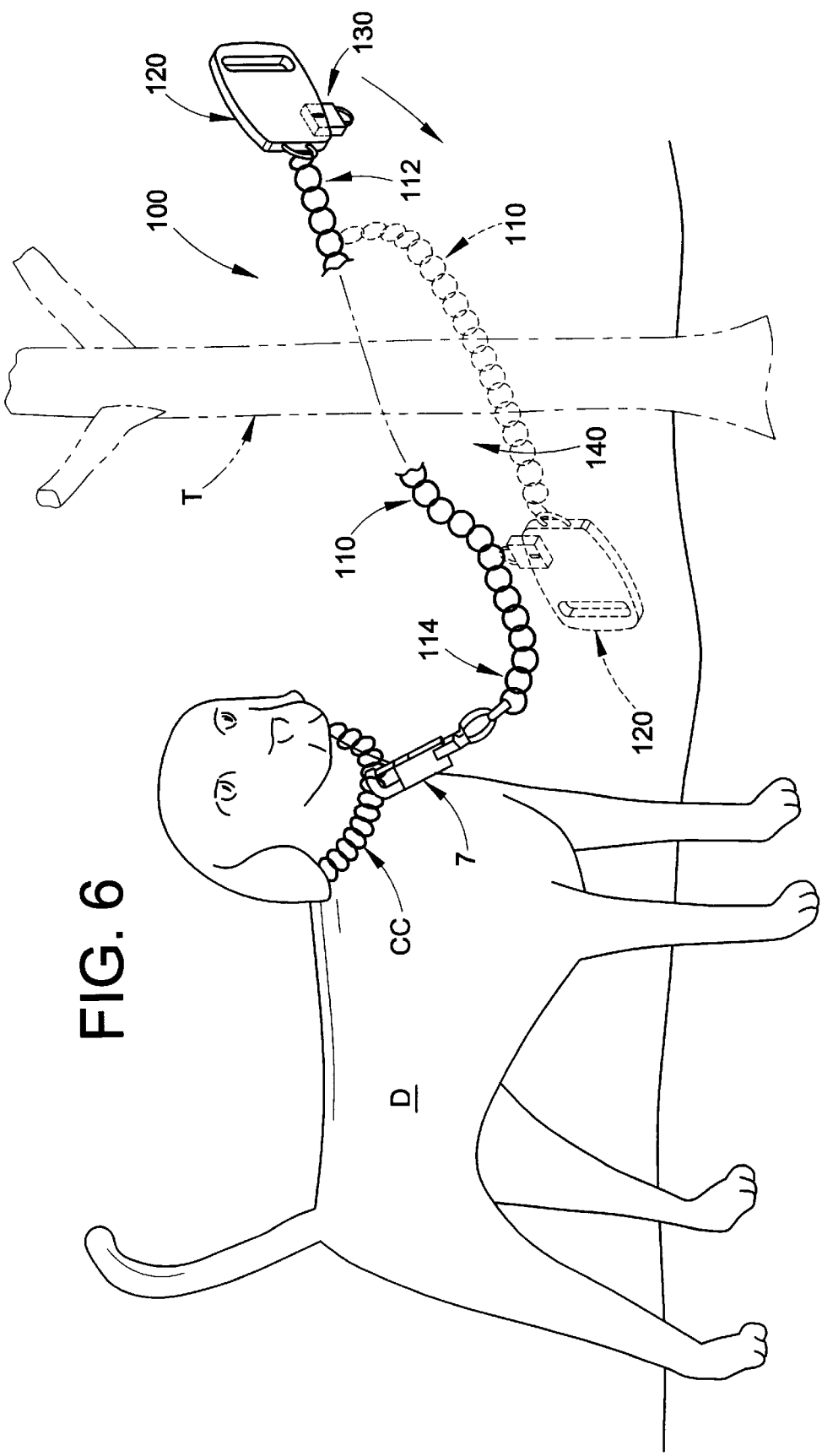

METHOD AND APPARATUS FOR SECURING A PET

CROSS-REFERENCE TO RELATED APPLICATIONS

This application is a continuation or commonly owned U.S. application Ser. No. 08/921,631 filed Aug. 27, 1997 (now U.S. Pat. No. 6,095,094) and U.S. provisional application Ser. No. 60/132,180 filed May 3, 1999, the disclosures of which are hereby expressly incorporated by reference herein, which claim benefit of Ser. No. 60/024,620 filed Aug. 27, 1996 which claim benefit to provisional No. 60/038,924 filed Feb. 22, 1997.

BACKGROUND OF THE INVENTION

The present invention relates generally to animal leashes having locking mechanisms for preventing the unauthorized release or theft of the associated animal. The invention will be described with particular reference to pet dogs, but those of ordinary skill in the art will recognize that the present invention is equally applicable to securing any other type of animal such as horses, cats, and the like.

People all over the world enjoy special relationships with their pets. It is very common for people to walk their dogs on a leash when performing errands or other activities. Unfortunately, during these activities, it is often necessary to tether the dog to a post or other permanent structure and leave the tethered dog unattended. This has lead to theft or unauthorized release of the dogs which is, obviously, highly undesirable.

Thus, there has been found a need for a method and apparatus for securing a pet, such as a dog, in a convenient, safe, and effective manner.

SUMMARY OF THE INVENTION

In accordance with the present invention, a method and apparatus for securing a pet are provided. The apparatus comprises an elongated leash having a proximal end and a distal end. The distal end of the leash includes a clasp connected thereto, and the clasp, itself, includes a locking mechanism (such as a key lock or a combination lock) therein that allows the clasp to open and close when unlocked and that prevents opening of the clasp when locked. The clasp is adapted for connection to a collar or a harness worn by the associated animal to be secured. When the clasp is connected to the collar or harness, enlargement of same for purposes of releasing the associated animal is prevented. Further, when the locking mechanism of the clasp is locked after the clasp has been connected to the collar or harness, unauthorized removal of the clasp from the collar or harness is prevented. The proximal end of the leash includes a handle that is preferably defined from conventional molded plastic or the like. A lock, such as a conventional padlock is fixedly secured to the handle. Thus, the proximal end of the leash, including the handle, is adapted for being wrapped around a post, tree, or other structure and the lock connected to the leash, itself so that a loop is formed around the structure. The lock prevents unauthorized removal of the loop.

One advantage of the present invention resides in the provision of a new and improved method and apparatus for securing a pet.

Another advantage of the present invention is that it is usable with a conventional choke collar.

Still another advantage of the present invention is that it provides a safe, convenient, and effective method and apparatus for securing an unattended pet against theft or other unauthorized release.

Yet another advantage of the present invention is that it is usable as a conventional, non-secure leash if desired without modification.

Still other benefits and advantages of the present invention will become apparent to those of ordinary skill in the art to which the invention pertains upon reading and understanding the following specification.

BRIEF DESCRIPTION OF THE DRAWINGS

The invention takes form from various steps and arrangements of steps, and in various steps and arrangements of steps, preferred embodiments of which are illustrated in the accompanying drawings that form a part hereof and wherein:

FIG. 6 illustrates a method and apparatus for securing a pet in accordance with a second embodiment of the present invention, wherein the animal to be secured is wearing a conventional choke collar;

DETAILED OF THE PREFERRED EMBODIMENTS

Figure 1:
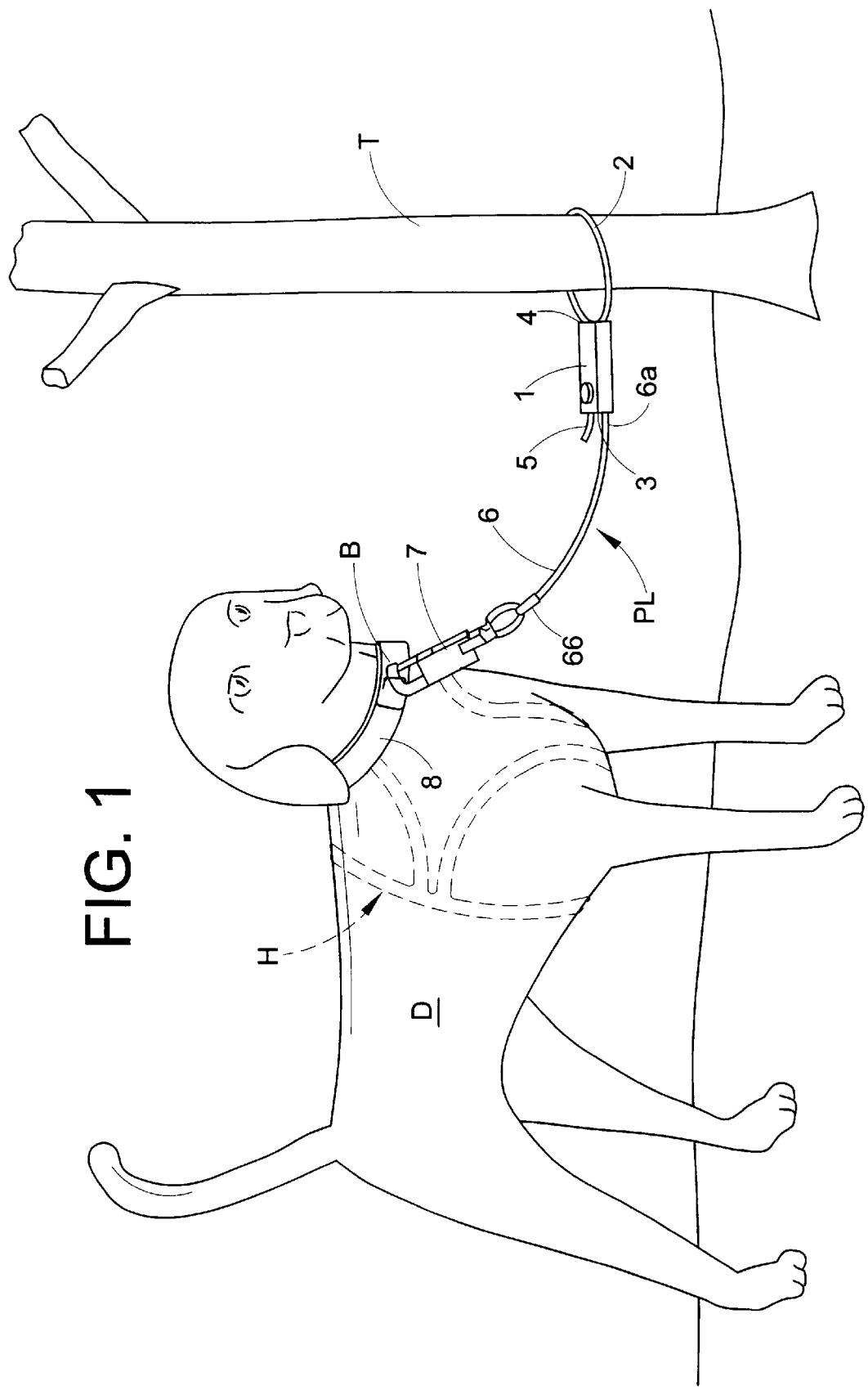
FIG. 1 is a depiction of an apparatus for securing a pet formed in accordance with a first embodiment of the present invention as used to secure a pet against theft or unauthorized release.

Referring now to the drawings, wherein the showings are for purposes of illustrating preferred embodiments of the invention only and not for purposes of limiting same, FIG. 1 shows a dog D secured to a tree T by means of an apparatus PL for securing a pet formed in accordance with a first embodiment of the present invention. The apparatus PL comprises three major elements: a handle lock 1; a lockable sliding clasp 7 fixedly secured to a leash 6; and a collar 8 including a permanent buckle unit B.

The lockable handle 1 provides means by which the leash 6 leading from the animal D is readily passed through the first of two channels 3 to then form a loop 2 that is shown for purposes of this illustration to be passing around a tree T and again passing through the second channel 4 in the handle. The free end 5 of the leash 6 can be readily adjusted to any desired length prior to locking the handle 1 to accommodate thin or thick stationary objects and to provide the desired length of leash 6 between the stationary object, such as the illustrated tree T, and the pet animal D. The handle 1 provides for individual adjustment of the length of the leash 6 between the handle 1 and the animal D, and the length of the free end 5 of the leash 6 that protrudes from the handle 1. This, then, ensures full control of the pet animal D at all times while attaching, adjusting or removing the leash 6 relative to the handle. The handle 1 is located at a proximal end 6a of the leash 6 and includes a lock, such as a key lock or a combination lock, that prevents its unauthorized operation so that, once a loop 2 is formed around an object such as the tree T, only an authorized user can unlock the handle 1 and to remove the loop 2 to release the animal D.

Figure 2:
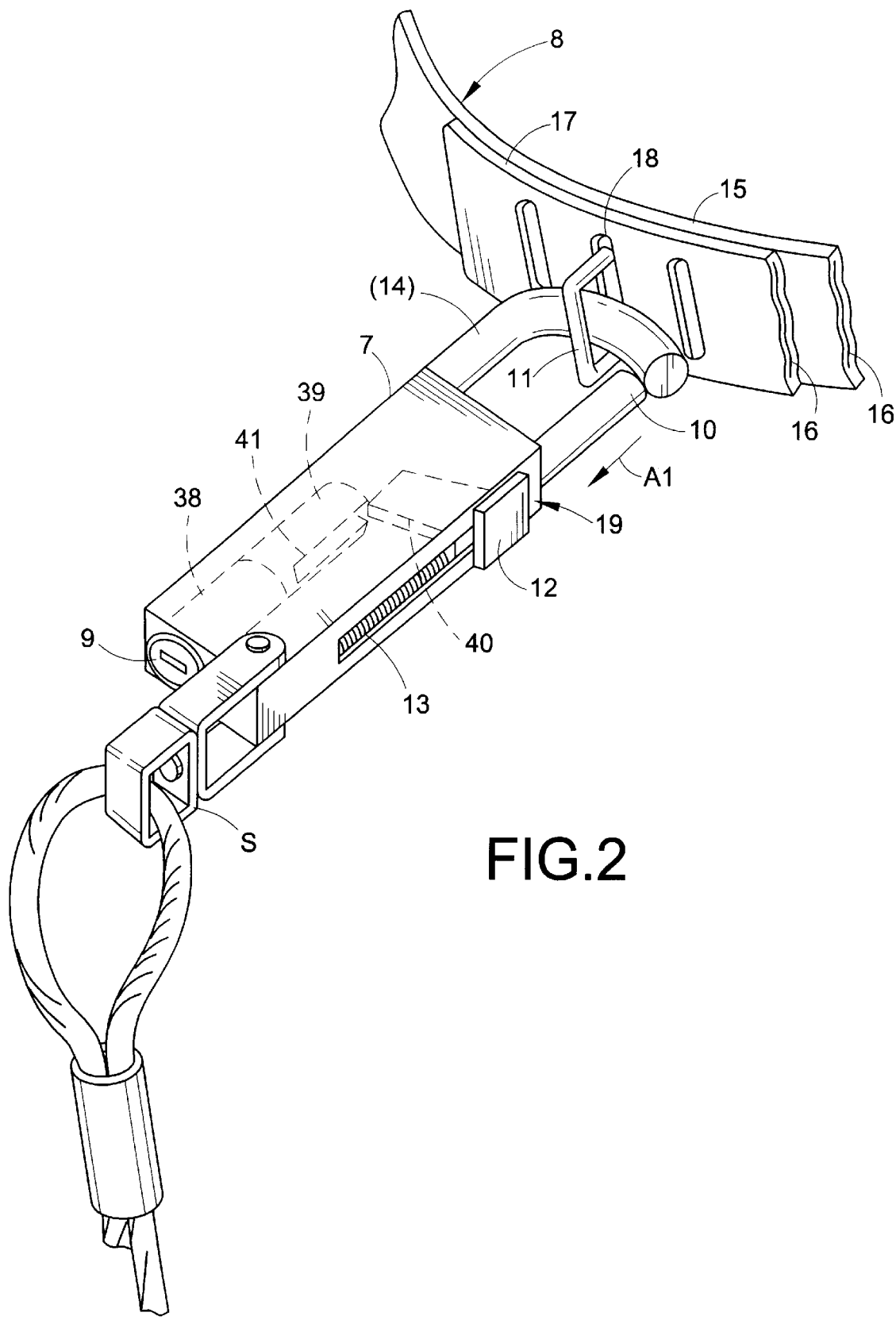
FIG. 2 is a partial perspective view of the distal end of a leash formed in accordance with the pet securement apparatus of the present invention, including a lockable sliding clasp shown in its unlocked position and connected to a collar or harness to be worn be an animal to be secured.

FIG. 2 illustrates the distal end 6b of the leash 6, opposite the proximal end 6a, as it is permanently or otherwise fixedly secured to a swivel-ring S. The swivel-ring S is, in turn, permanently or otherwise fixedly secured to a lockable sliding clasp 7. More particularly, the swivel-ring S permanently attaches to the lockable sliding clasp 7 in a manner that allows the clasp 7 to rotate, thereby exposing and covering a key-hole 9 in the clasp 7 depending upon the angular position of same relative to the swivel-ring S.

As is described below, the lockable sliding clasp 7 can be selectively locked in a closed position with use of an integral key lock (that preferably uses the same key as that required to unlock the handle 1) or an integral combination lock. On the other hand, when unlocked, the lockable sliding clasp 7 operates in a conventional manner.

With continuing reference to FIG. 2, the lockable sliding-clasp assembly 7 has an internal, key-activated locking mechanism 38. With the locking mechanism 38 deactivated or unlocked, the clasp 7 functions as a standard sliding-clasp, i.e., a sliding clasp with an external thumb-hitch 12 that allows a user to move or slide the pin 10 manually between open and closed positions. An internal spring 13 biases the sliding pin 10 into the closed position as illustrated once the user ceases applying pressure on the thumb-hitch 12. However, when the locking mechanism 38 is activated by the key (or by a combination if it is a combination lock), the sliding pin 10 is prevented from moving out of its closed position until the locking mechanism 38 is unlocked.

The clasp 7 includes or defines an open fastening hook 14. When the sliding pin 10 is moved to its opened position (indicated by the arrow Al), the hook 14 of the clasp 7 is able to be engaged with a mating ring or the like such as the ring 11 illustrated in FIG. 2. However, when the sliding pin 10 is moved to its closed position as illustrated, the pin 10 and the hook 14 together define a closed ring or shackle that prevents disengagement of the hook 14 from a mating ring 11 or the like.

The internal locking mechanism 38 is integral to the clasp 7 and preferably comprises a rotating cylinder 39 or other rotating member that selectively engages a tail 40 or other portion of the sliding pin 10. The rotating cylinder 39 is operatively connected to the key lock 38 so that it rotates between first and second positions when an authorized key is turned in the keyhole 9. In a first position as shown, the cylinder 39 does not engage or block the tail 40 or other portion of the thumb hitch 12 and, thus, the thumb hitch 12 and pin 10 connected thereto are free to move under manual force as indicated by the arrow Al. On the other hand, when rotated to its second operative position, the cylinder 39 engages the tail 40 of the thumb hitch 12 or otherwise blocks movement of the same required in order to move the sliding pin 10 to its opened position. Thus, when the cylinder 39 is in its second operative position, the sliding pin 10 is locked in its closed position so that the hook 14 of the clasp 7 cannot be disengaged from a mating member such as the ring 11.

As illustrated in FIG. 2, the sliding clasp 7 secures the collar 8 against removal from the animal by which it is worn. A metal loop or ring 11 is permanently attached to the collar near the buckle end 15 of same. The collar preferably comprises two layers of suitable natural or synthetic flexible material (tubular Nylon webbing for example) that sandwich a flexible metal cable or other metal reinforcement means 16. The free end 17 of the collar 8 has a plurality of metal trimmed eyelet slots 18 defined therethrough and adapted to accept the metal ring 11 provided near the buckle end 15 of the collar when the collar is placed about the neck or other region of an associated animal. Once the collar 8 is placed about an animal's neck, the collar is adjusted to size so that the ring 11 projects outwardly from one of the slots 18. Then, the lockable sliding clasp 7 is engaged with the ring 11 as shown to prevent removal of the collar from the associated animal by which the collar 8 is being worn. Of course, when the locking mechanism 38 is locked, unauthorized removal of the collar 8 is prevented.

Figure 3:
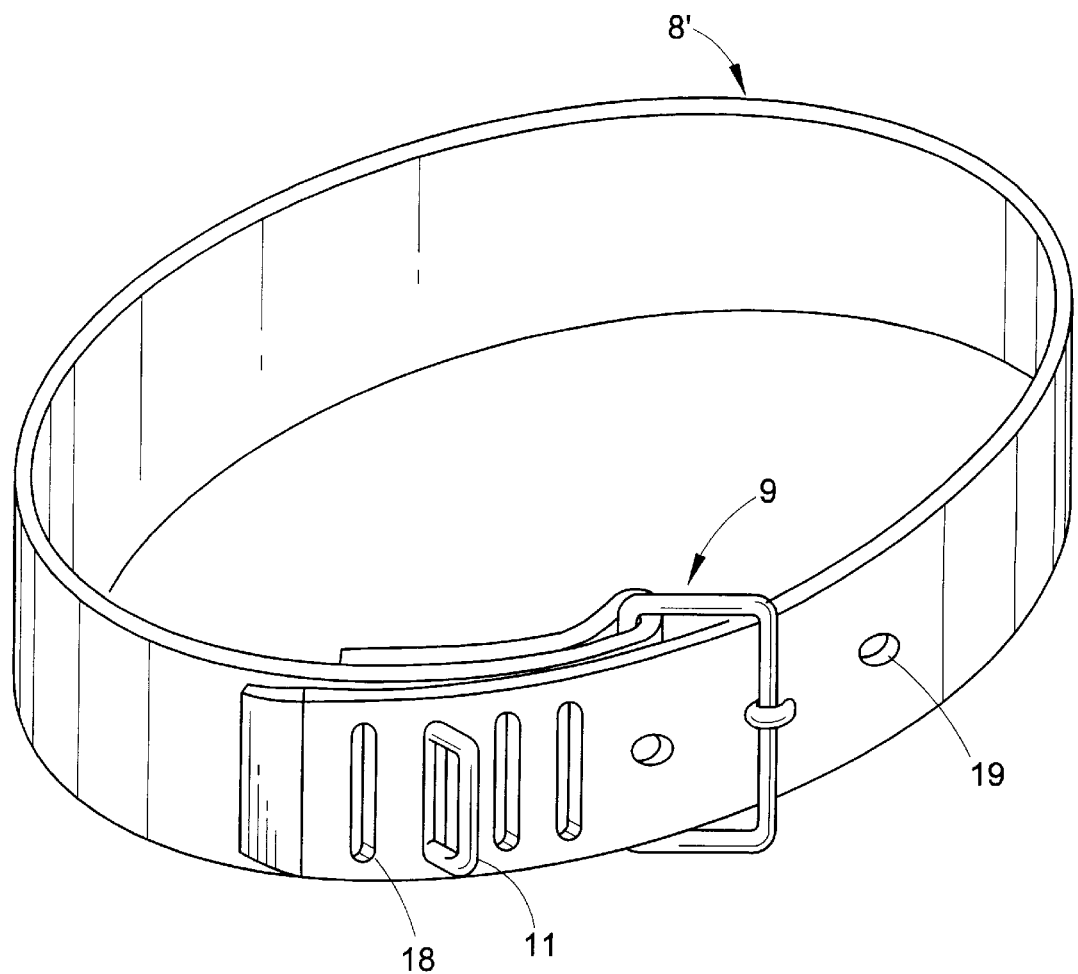
FIGS. 3 and 4 respectively illustrate first and second collars, each of which can be provided as part of a pet securement apparatus formed in accordance with a first embodiment of the present invention.

As illustrated in FIG. 3, an alternative collar 8' is identical in all respects to the collar 8, but further comprises a conventional buckle 9 that cooperates with size-adjustment holes 19 defined in the collar 8'. The buckle 9 is used to size the collar and, once the collar is sized, the ring 11 projects through and outwardly from one of the slots 18 as shown. Then, the lockable sliding clasp 7 can be connected to the ring 11 as described above in relation to FIG. 2 to prevent enlargement of the collar 8' as would be required to remove same from the animal by which it is worn.

Figure 4:
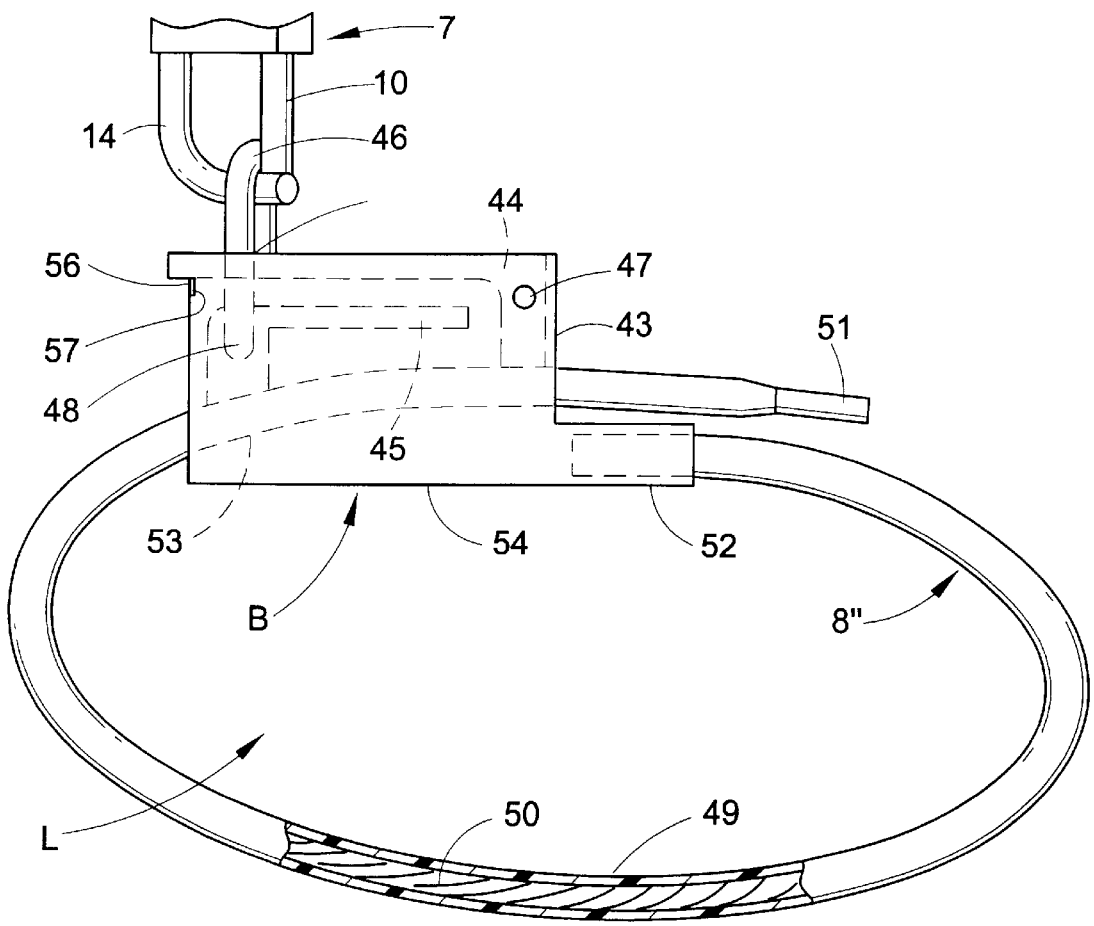

FIG. 4 illustrates another collar 8" formed in accordance with the present invention. The collar 8" comprises a non-slip cam collar buckle unit B that comprises: an outer housing 43, a hinged-cover 44, an inner cam member 45, and a C-ring 46. The hinged-cover 44 is pivotably connected to the housing member 43 by way of engagement with holes 47, while the C-ring 46 and the cam member 45 are pivotably connected to the outer housing member 43 by way of engagement with the holes 48.

The collar 8", itself, comprises synthetic or natural tubular webbing 49 that covers a braided stainless or other metal cable 50. The collar 8" includes a free end 51 opposite the end to which the buckle B is permanently affixed. The cable and tubular webbing are preferably secured together at a free end 51 of the collar 8" by a flattened metal end-piece. The cable 50 is permanently attached at its opposite end 52 to the non-slip cam collar buckle unit B by any suitable means such as epoxy, screws, pins, or the like.

Figure 5:
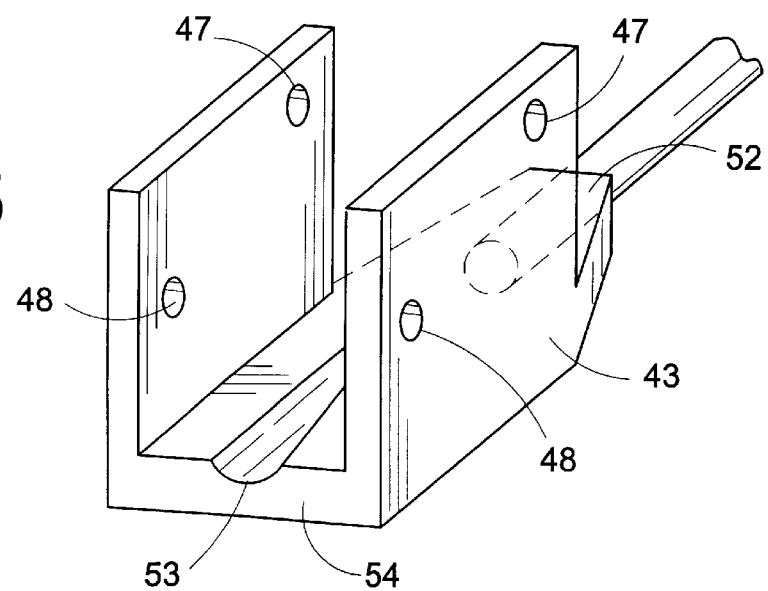
FIG. 5 illustrates a portion of a non-slip cam collar buckle collar.

With reference to both FIGS. 4 and 5, the outer housing member 43 of the buckle B defines a semi-circular groove 53 in a lower wall or floor portion 54 opposite the end at which the collar cable 50 is permanently attached. It is through this groove 53 that the free end 51 of the collar 8" enters the buckle B. The collar buckle B acts as a non-slip cam mechanism that is oriented in such a manner that gripping force exerted by the cam member 45 upon both the tubular webbing and cable is increased when the collar 8" is pulled through the buckle B in the direction that would increase the collar circumference, i.e., the size of the loop L.

In particular, as illustrated in FIG. 4, once the free end 51 of the collar is passed through the buckle B so that a portion of the collar 8" lies in the groove 53, the cam member 45 is pivoted so that it grips the collar 8" in the groove 53. The size of the loop L defined by the collar 8" can be adjusted before the cam member 45 is pivoted into a position where it grips the portion of the collar 8" in the groove 53. However, once the cam member 45 is moved into its locked position as shown, it is not possible to increase the size of the loop L.

As illustrated in FIG. 4, access to the cam member 45 to release same and permit enlargement of the loop L is denied when the hinged-cover 44 is placed in its closed position. When the hinged-cover 44 is in its closed position as illustrated in FIG. 4, the C-ring 46 passes upwardly through same by way of a slot 55 defined in the cover 44. The lockable sliding clasp 7 attaches to the C-ring 46 or directly to the housing 43 and thereby prevents opening of the cover 44 and/or operation of the cam member 45 by preventing the C-ring 46 from moving through the slot 55 in the cover 44 or by directly blocking movement of the cam member. This, then prevents unauthorized operation of the cam member 45 for purposes of enlarging the loop L defined by the collar 8" and stealing or releasing the animal wearing the collar.

Alternative Embodiment

Turning now to FIG. 6, an alternative apparatus for securing a pet D to a tree or other structure T in accordance with the present invention is illustrated generally at 100. The apparatus 100 comprises an elongated leash member 110 preferably defined by or comprising a length of conventional link chain. A handle lock 120 is fixedly secured to a proximal end 112 of the leash 110, and the handle is adapted for being held by a dog handler. The handle lock comprises a conventional key or combination lock 130, such as a padlock, fixedly secured thereto.

As illustrated in broken lines, the proximal end 112 of the leash can be formed into a loop 140 about a tree T or other structure. Unauthorized removal of the loop 140 is prevented by engagement of the lock 130 with the leash 110, itself. Thus, the handle 120 provides an alternative to the handle 1 described above and can be used as an alternative thereto. Of course, in forming the loop 140, the lock 130 can be connected at any location on the leash 110 to form the loop 140 to have any desired size. Further, the lock 130 can be connected simultaneously to more than one location on the leash 110 to: (a) control the size of the loop 140; and, (b) control the length of the leash 110 between the handle 120 and the distal end 114 of the leash. The handle 120 is preferably defined from a molded plastic material.

A lockable sliding clasp 7, as described above, is fixedly and securely connected to the distal end 114 of the leash 110.

Thus, the apparatus 100 can be used with any of the collars 8, 8', 8" described above to secure a pet D to a structure such as a tree T. However, as illustrated in FIGS. 6–7B, the apparatus 100 is preferably used to secure a pet D that is wearing a conventional choke collar CC.

Figure 7A:
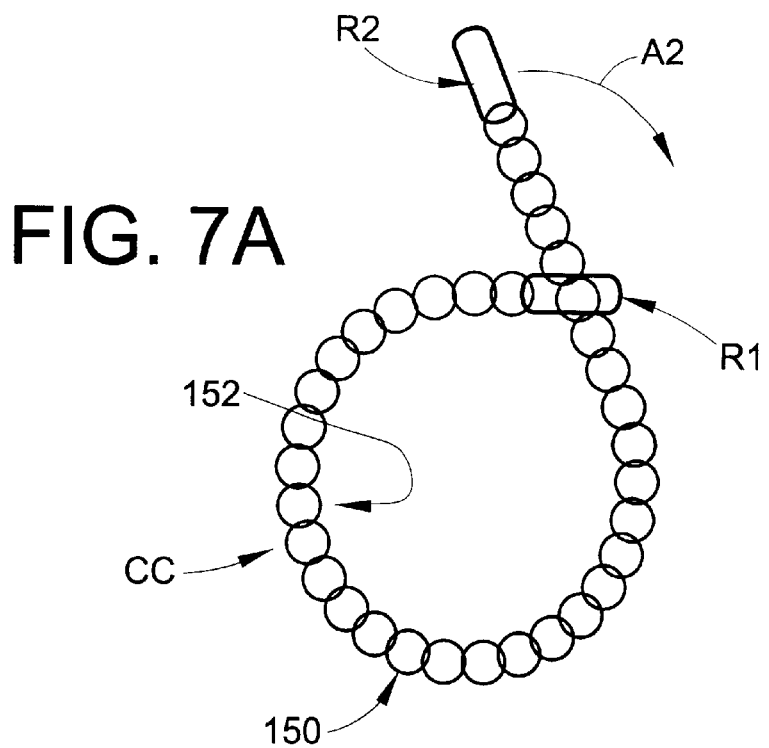
FIG. 7A illustrates a conventional choke collar.

Turning to FIG. 7A, a conventional choke collar CC is typically defined by a length of chain 150 terminated at its opposite ends by equal size rings R1,R2. The length of chain 150 is passed through one of the rings R1 so that an adjustable sized loop 152 is defined by the length of chain 150. This loop 152 is adapted for placement over an animal's head and around the animal's neck as is well known. As is also well known the clasp at a distal end of a leash is connected to the free ring—the ring R2 as illustrated in FIG. 7A.

Figure 7B:
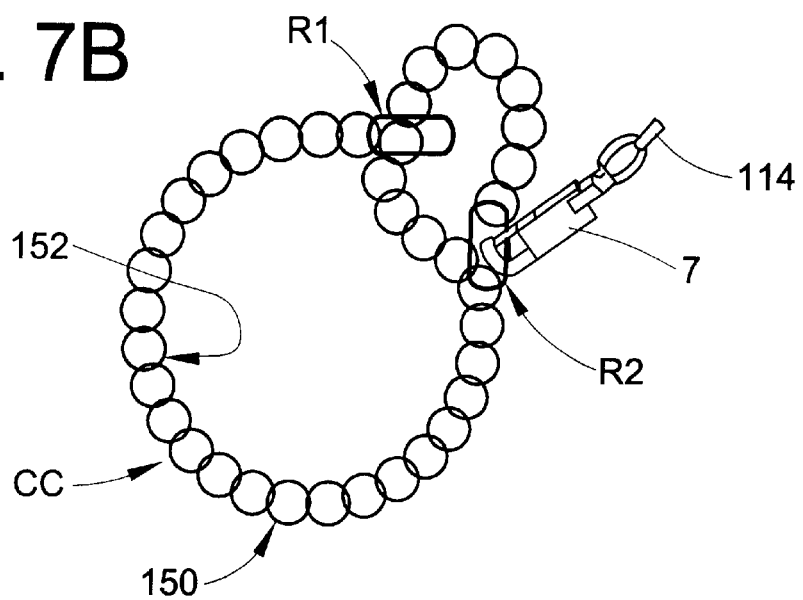
FIG. 7B illustrates operative interconnection of the lockable sliding clasp shown in FIG. 2 to the conventional choke collar of FIG. 7A to prevent unauthorized operation of the choke collar and release of the animal wearing same.

Referring now to FIG. 7B, unauthorized removal of the choke collar CC from the animal is prevented by adjusting the loop 152 to tightly encircle the animal's neck and, then, using the lockable sliding clasp 7 to fix the size of the loop 152. Preferably, the free end of the chain 150 to which the ring R2 is attached (and to which the clasp 7 is already attached in a conventional arrangement) is folded backward upon itself as indicated by the arrow A2 (FIG. 7A) and the lockable sliding clasp 7 is used to fix the ring R2 to at least one of the links of the length of chain 150.

In still another alternative embodiment, the distal end 114 of the leash 110 can, itself, be formed into a loop that defines a choke collar to be worn by the animal to be secured. In this embodiment, the hook portion 14 of the lockable slide clasp 7 is simply connected to the leash 110 between the proximal and distal ends 112,114 at a location that will vary depending upon the size of the animal's neck.

It is intended that the term "collar" as used herein be construed to encompass a harness that is worn by a dog or other animal about its neck and/or torso. It is not intended that the term "collar" be construed as describing a member that encircles only the neck of an animal. Further, of course, any of the collars 8,8',8" can be provided as part of a harness H as illustrated in broken lines in FIG. 1.

The invention has been described with reference to alternative embodiments. Changes and alterations will occur to others upon reading and comprehending the foregoing specification, and it is intended that the invention be construed as including all such modifications and alterations insofar as they are encompassed by the following claims and equivalents.

Having thus described the preferred embodiments, what is claimed is:

1. An apparatus for securing an animal against theft, said apparatus comprising:

an elongated leash having a proximal end and a distal end;

a handle connected to the proximal end of the leash, said handle comprising a handle lock mechanism whereby said proximal end of said leash is adapted for being formed into a loop about a structure and whereby said handle lock mechanism is attached and locked to said leash, itself, to prevent unauthorized removal of said loop from said proximal end of said leash;

a clasp connected to said distal end of the leash, said clasp adapted for being operatively and fixedly secured to a collar or a harness worn by an animal to be secured, said clasp, when connected to said collar or harness preventing removal of said collar or harness, wherein said clasp is a slide clasp including a slide pin and a thumb-hitch connected to said slide pin, said thumb-hitch adapted for manual movement so as to move said slide pin together therewith, said slide pin adapted for movement between a first position wherein a hook portion of said clasp is open and a second position wherein said hook portion of said clasp is closed; and a lock mechanism connected to said clasp, said lock adapted for selective placement in a locked condition when said clasp is connected to said collar or harness to prevent unauthorized disconnection of said clasp from said collar or harness, wherein said lock mechanism of said clasp, when in said locked condition, blocks movement of said slide pin from said second position to said first position.

2. The apparatus for securing an animal as set forth in claim 1, further comprising a choke collar defined from a length of chain having a plurality of links and first and second rings at opposite ends of said length of chain, wherein said clasp is adapted for simultaneous connection to one of said rings and at least one of said plurality of chain links to fix the size of a loop defined by said choke collar.

3. The apparatus for securing an animal as set forth in claim 1, wherein said handle is defined from molded plastic.

4. The apparatus for securing an animal as set forth in claim 1, wherein said lock mechanism of said handle and said lock mechanism of said clasp are key-activated lock mechanisms that each accept an operative key for operation of said lock mechanism, wherein a single operative key is accepted by both said lock mechanism of said handle and said lock mechanism of said clasp.

5. The apparatus for securing an animal as set forth in claim 1, wherein said lock mechanism of said handle and said lock mechanism of said clasp are combination locks.

* * * * *